(12) United States Patent
Traveis et al.

(10) Patent No.: US 6,329,727 B1
(45) Date of Patent: Dec. 11, 2001

(54) POWER SUPPLY CONTROLLER

(75) Inventors: Gary J. Traveis, Los Gatos; Philip D. Olson, Kenwood, both of CA (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

(21) Appl. No.: 09/500,059

(22) Filed: Feb. 8, 2000

(51) Int. Cl.$^7$ ..................................................... H01H 31/10
(52) U.S. Cl. ............................................. 307/115; 323/282
(58) Field of Search ................................... 307/114, 115; 323/283, 284, 282

(56) References Cited

U.S. PATENT DOCUMENTS 4,419,619 * 12/1983 Jindrick et al. .
5,029,244 * 7/1991 Fowler .
5,691,870 * 11/1997 Gebara .
5,982,645 * 11/1999 Levran et al. .

* cited by examiner

Primary Examiner—Edward H. Tso
(74) Attorney, Agent, or Firm—Pennie & Edmonds LLP

(57) ABSTRACT

A microcontroller generates a digital signal in response to input data, such as temperature and/or fan speed data. The digital signal is converted to an analog signal that is used to control a variable power supply. The variable power supply outputs a regulated substantially constant output voltage at a voltage level corresponding to the value of the digital signal. The analog signal is produced by a resistor divider and a feedback adjustment circuit that includes a plurality of resistive elements that are selectively coupled in parallel with a portion of the resistor divider in response to the digital signal. The resistive elements coupled in parallel with the portion of the resistor divider adjust the voltage generated at the resistor divider's center node. The voltage on the center node is the analog signal that is used to control the variable power supply.

20 Claims, 2 Drawing Sheets

POWER SUPPLY CONTROLLER

The present invention relates generally to devices for controlling the speed of a fan, such as a fan for cooling heat generating equipment, by regulating a power supply voltage delivered to the fan, and in particular to a microcontroller based fan controller apparatus and control method.

BACKGROUND OF THE INVENTION

Many systems require a variable speed fan (or blower) to control circuitry temperature and/or heat output. Control of the fan can be accomplished using a series-pass circuit, however this solution generates too much heat and is energy wasteful. Alternatively, fan control can be accomplished using a standard pulse-width-modulated (PWM) power control circuit. Generally, a microcontroller generates a precisely-timed pulse train to drive the power switching circuitry, which outputs a desired voltage that drives the fan. However, the PWM arrangement has several shortcomings. First, there are a number of relatively large discrete components needed to generate, filter and regulate the PWM output voltage. When a power source is significantly above the maximum operating voltage of the fan, extra protection circuitry is needed to prevent a catastrophic failure in the event of a microcontroller crash. An inexpensive microcontroller's software-timing and clock-rate require the PWM circuitry to be designed to operate at a relatively low frequency, thus making the PWM arrangement less efficient and physically larger. Moreover, the microcontroller must communicate in real time with one or more host devices while performing the PWM power supply control as well as other functions; thus, resulting in a difficult and costly firmware programming challenge.

Accordingly, it is an object of the present invention to provide a fan controller system, and a PWM power supply control system, that removes the real-time power control functions from the microcontroller, thereby reducing the parts-count, energy waste and firmware complexity of such systems.

SUMMARY OF THE INVENTION

A microcontroller generates a digital signal in response to input data, such as temperature and/or fan speed data. The digital signal is converted to an analog signal that is used to control a variable power supply. The variable power supply outputs a regulated substantially constant output voltage at a voltage level corresponding to the value of the digital signal. The analog signal is produced by a resistor divider and a plurality of resistive elements that are selectively coupled in parallel with a portion of the resistor divider in response to the digital signal. An upper end of the resistor divider is coupled to the output voltage and a lower end is coupled to a reference voltage such as circuit ground. The resistive elements coupled in parallel with a portion of the resistor divider adjust the voltage generated at the resistor divider's center node. The voltage on the center node is the analog signal that is used to control the variable power supply.

The present invention relieves the microcontroller from having to perform real-time pulse-width modulation power regulation, thereby reducing the parts-count, energy waste and firmware complexity of the control system in which the microcontroller is used. Further, the present invention guarantees at least minimal operation, at a safe operating voltage, in the event of a microcontroller failure.

BRIEF DESCRIPTION OF THE DRAWINGS

Additional objects and features of the invention will be more readily apparent from the following detailed description and appended claims when taken in conjunction with the following drawings:

DETAILED DESCRIPTION OF THE PREFERRED EMBODIMENTS

Figure 1:
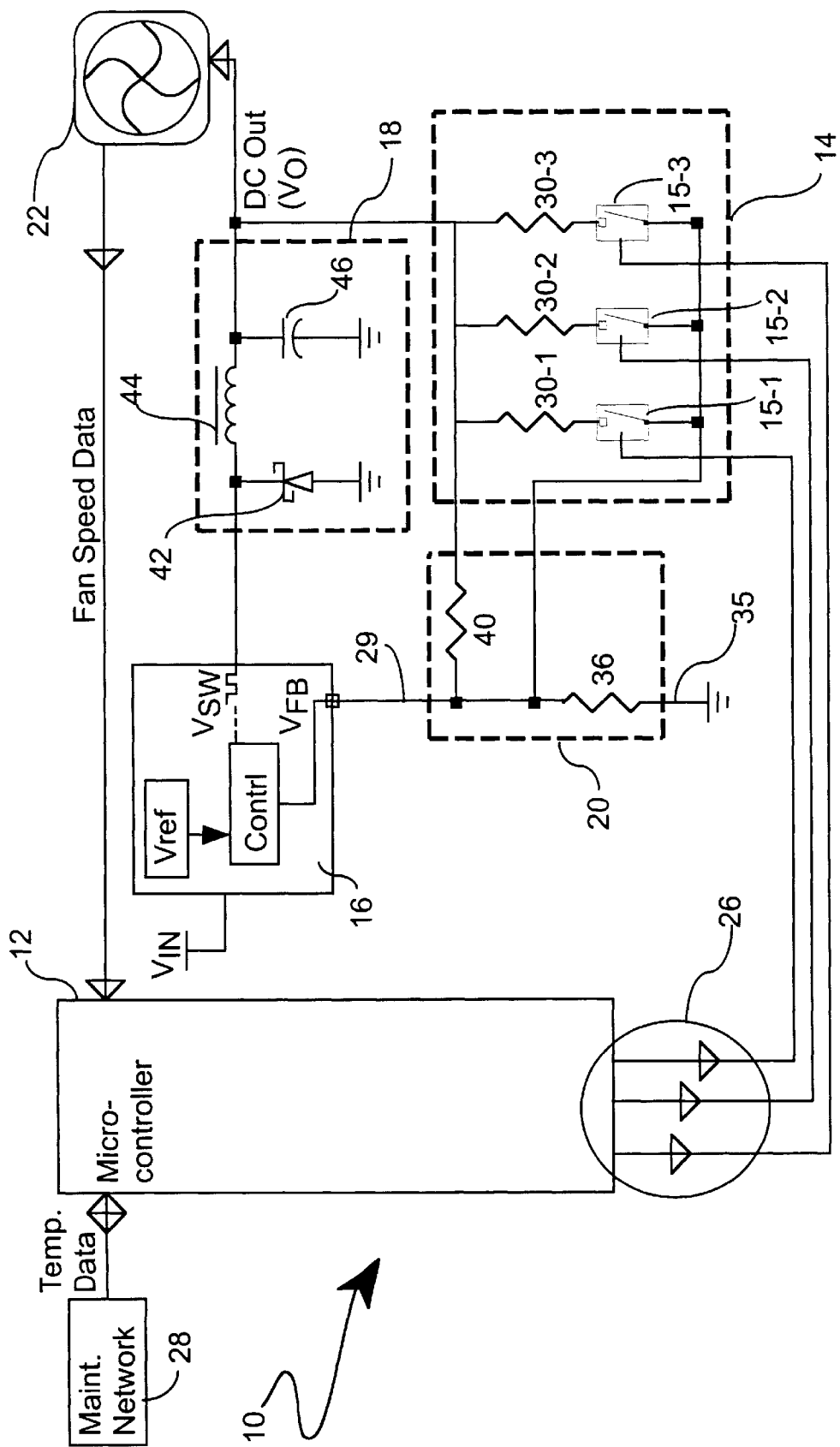
FIG. 1 is a circuit diagram for a fan control system in accordance with an embodiment of the present invention.

Referring to FIG. 1 there is shown a fan controller system 10 according to an embodiment of the present invention. System 10 includes microcontroller 12, a variable-output power supply 16 (such as the single-chip power supply LT1074 produced by Linear Technology Corp.), LC filter 18, resistor divider 20, feedback adjustment circuit 14, and fan 22. The feedback adjustment circuit 14 includes a set of resistors 30, each of which is controllably connected to the feedback adjustment circuit by a corresponding optocoupler 15 (such as a PS2501 from NEC). Resistor divider 20 is also called the feedback circuit. The effective resistance of the feedback circuit 20 is adjusted by the feedback adjustment circuit 14.

LC filter 18 includes a Schottky diode 42 (to prevent the voltage output node of the power supply 16 from going below circuit ground), an inductor 44 and a capacitor 46, connected as shown in FIG. 1. The power supply 16 receives an input power supply voltage $V_{IN}$ substantially in excess of the maximum operating voltage of the fan 22. In a preferred embodiment, the input power supply voltage $V_{IN}$ of power supply 16 is 48 volts, while the maximum operating voltage of fan 22 is 24 volts, and the $V_{CC}$ power supply used by the microcontroller 12 is preferably 5 volts or less.

Each of the optocouplers 15 selectively, in response to a logic level control signal, connects a corresponding one of the resistors 30 in parallel with the upper portion (i.e., resistor 40) of the resistor divider 20. The skilled artisan will recognize that each of the optocouplers 15 may be replaced with any coupler that is controllable by an appropriate electrical control signal, so long as the coupler controllably connects one node of a respective resistor 30 to the center node 29 of the feedback circuit 20 when the electrical control signal is in a first state and otherwise isolates the resistor 30 from the circuit. The resistors 30 may be replaced by various combinations of resistors coupled in parallel, series, or both without deviating from the scope of the present invention, so long as the resistance of the feedback circuit 20 is adjusted in a predictable manner as a function of a set of control signals generated by the microcontroller 12.

The speed of fan 22 is controlled by varying the output voltage ($V_O$) from variable-output power supply 16 and LC filter 18. Power supply 16 outputs a square wave signal $V_{SW}$ having a peak voltage of $V_{IN}$. The LC filter 18 converts the square wave signal into the DC output voltage ($V_O$). $V_O$ is regulated by varying the effective resistance of resistor divider 20, which provides a feedback voltage $V_{FB}$ to power supply 16. Power supply 16 adjusts the output voltage $V_O$ until $V_{FB}$ is approximately equal to an internal voltage reference (not shown) of power supply 16. $V_{FB}$ is preferably 2.21V in model LT1074 produced by Linear Technology Corp.

Resistor divider 20 includes resistor 40 coupled between the output voltage $V_O$ and the center node 29 of the resistor divider, and resistor 36 coupled between the center node 29 and circuit ground node 35. Each of the resistors 30 in the feedback adjustment circuit is coupled at one end to the output voltage $V_O$ and at the other end to a terminal of an optocoupler 15. If a respective optocoupler 15 is enabled, the second end of its corresponding resistor 30 is coupled to the center node 29 of the resistor divider, and thus the corresponding resistor is connected in parallel with resistor 40. Otherwise, if the optocoupler 15 is disabled, its corresponding resistor is "floating."

The effective resistance of resistor divider 20 is based upon the state of optocouplers 15. The state of optocouplers 15 is set by a 3-bit binary digital signal 26, which is determined by microcontroller 12 based on fan speed data from fan 22 and/or temperature data from maintenance network 28. Each 3-bit value corresponds to a different fan speed, which in turn corresponds to a different effective resistance of resistor divider 20. Each bit of the digital signal 26 is coupled to a control port of a respective optocoupler 15, and causes that optocoupler 15 to either isolate or connect its corresponding resistor 30 to the center node 29 of the resistor divider 20. More generally, the digital signal 26 includes a number of individual binary signals that is at least equal in number to the number of optocouplers 15.

In other implementations, circuit ground node 35 may be replaced by a reference voltage node at a voltage less than that of the reference voltage of power supply 16 (preferably 2.21V).

Connecting any of resistors 30, alone or in combination, reduces the net resistance of the upper portion of resistor divider 20, thereby causing the feedback voltage $V_{FB}$ to increase for any given output voltage $V_O$ level. Power supply 16 adjusts $V_O$ downward until the feedback voltage $V_{FB}$ returns to the reference voltage of power supply 16. Therefore, microcontroller 12 adjusts fan speed by changing digital signal 26, which controls the optocouplers 15, which varies the effective resistance of resistor divider 20, which causes power supply 16 to adjust the output voltage $V_O$ accordingly, thereby changing the fan speed accordingly. When resistors 30 are all isolated, also called floating, power supply 16 will output its maximum output voltage $V_O$ (e.g., approximately 24 volts). When resistors 30 are all connected in parallel with resistor 40, power supply 16 will output its minimum output voltage $V_O$ (approximately 14.5 volts).

In the event that the microcontroller 12 suffers a software or other failure (e.g., a software crash or a hardware failure), the output of the microcontroller 12 is not predictable. Nevertheless, the operation of the resistor divider 20 and feedback adjustment circuit 14 assure that output voltage $V_O$ generated by the power supply 16 and filter 18 will not exceed a well defined upper limit (e.g., 24 volts) and furthermore will not fall below a well defined lower limit (e.g., 14.5 volts), even when operation of the microcontroller 12 fails. So long as the fan controller system 10 continues to receive power and the power supply 16 does not suffer a circuit failure, the fan 22 will continue to be operated at a voltage within its allowed operating range. For instance, if microcontroller 12 crashes in a manner that leaves the digital signal at a value of 0 (i.e., with all resistors 30 floating), the speed of the fan will be the same as if the microcontroller were working properly and outputting a digital signal value of 0. Similarly, if the microcontroller 12 fails in a manner that leaves the digital signal at a value of 7 (i.e., with all resistors 30 coupled in parallel to resistor 40), the speed of the fan will be the same as if the microcontroller were working properly and outputting a digital signal value of 7. Thus, no matter what the state of optocouplers 15 at the time of a microcontroller failure, the fan will be protected from catastrophic power surges and will remain running. In contrast, if the microcontroller 12 were directly controlling the generation of a pulsed voltage signal, a failure of the microcontroller 12 could result in the generation of an output voltage that is above or below the operating range of the fan (e.g., at $V_{IN}$ which is well above the operating voltage range of the fan, or at circuit ground, which is well below the operating voltage range of the fan).

Listed below in Table 1 are the specifications for a preferred embodiment of the present invention, along with Table 2, which provides output voltages corresponding to the values of the digital signal 26 for this preferred embodiment.

TABLE 1

Specification For A Preferred Embodiment

| | |
|---|---|
| Feedback Adjustment Circuit 14 | Resistor 30-1 = 10K ohms |
| | Resistor 30-2 = 20K ohms |
| | Resistor 30-3 = 47.5K ohms |
| Optocouplers 15 | PS2501 by NEC |
| Resistor Divider 20 | Resistor 36 = 442 ohms |
| | Resistor 40 = 4.32K ohms |
| LC Filter 18 | Schottky Diode 42 = MUR420 |
| | Inductor 44 = 330 $\mu$H |
| | Capacitor 46 = 150 $\mu$F |
| Variable-output Power supply 16 | LT1074 produced by Linear Technology Corp. |
| Input Voltage | $V_{IN}$ = 48 volts |

TABLE 2

| Digital Signal | State of Feedback Adjustment Circuit 14 | | | |
|---|---|---|---|---|
| | Resistor 30-1 | Resistor 30-2 | Resistor 30-3 | $V_o$ (v) |
| 0, 0, 0 | Float | Float | Float | 23.8 |
| 0, 0, 1 | Float | Float | Connected | 22 |
| 0, 1, 1 | Float | Connected | Connected | 18.7 |
| 0, 1, 0 | Float | Connected | Float | 20 |
| 1, 0, 1 | Connected | Float | Connected | 16.4 |
| 1, 0, 0 | Connected | Float | Float | 17.3 |
| 1, 1, 0 | Connected | Connected | Float | 15.3 |
| 1, 1, 1 | Connected | Connected | Connected | 14.6 |

The skilled artisan will recognize that other resistance values could be used for resistors 30 and that fewer or more than three resistors could be used in the feedback adjustment circuit. In the same vein, resistors 36 and 40 may have different resistance values from those shown in Table 1, depending on the desired maximum $V_O$, the reference voltage of power supply 16 and/or the voltage on node 35. The resistors used in the resistor divider 20, and the number of resistors and the particular resistance values used in the feedback adjustment circuit 14, can be selected to provide any selected minimum and maximum output voltage, more or fewer voltage steps between the minimum and maximum output voltages, and to set the voltages at each of those voltage steps.

The skilled artisan will also recognize that microcontroller 12 may serve other control and communications functions, such as controlling other devices and/or reporting the status of other devices for example.

Figure 2:
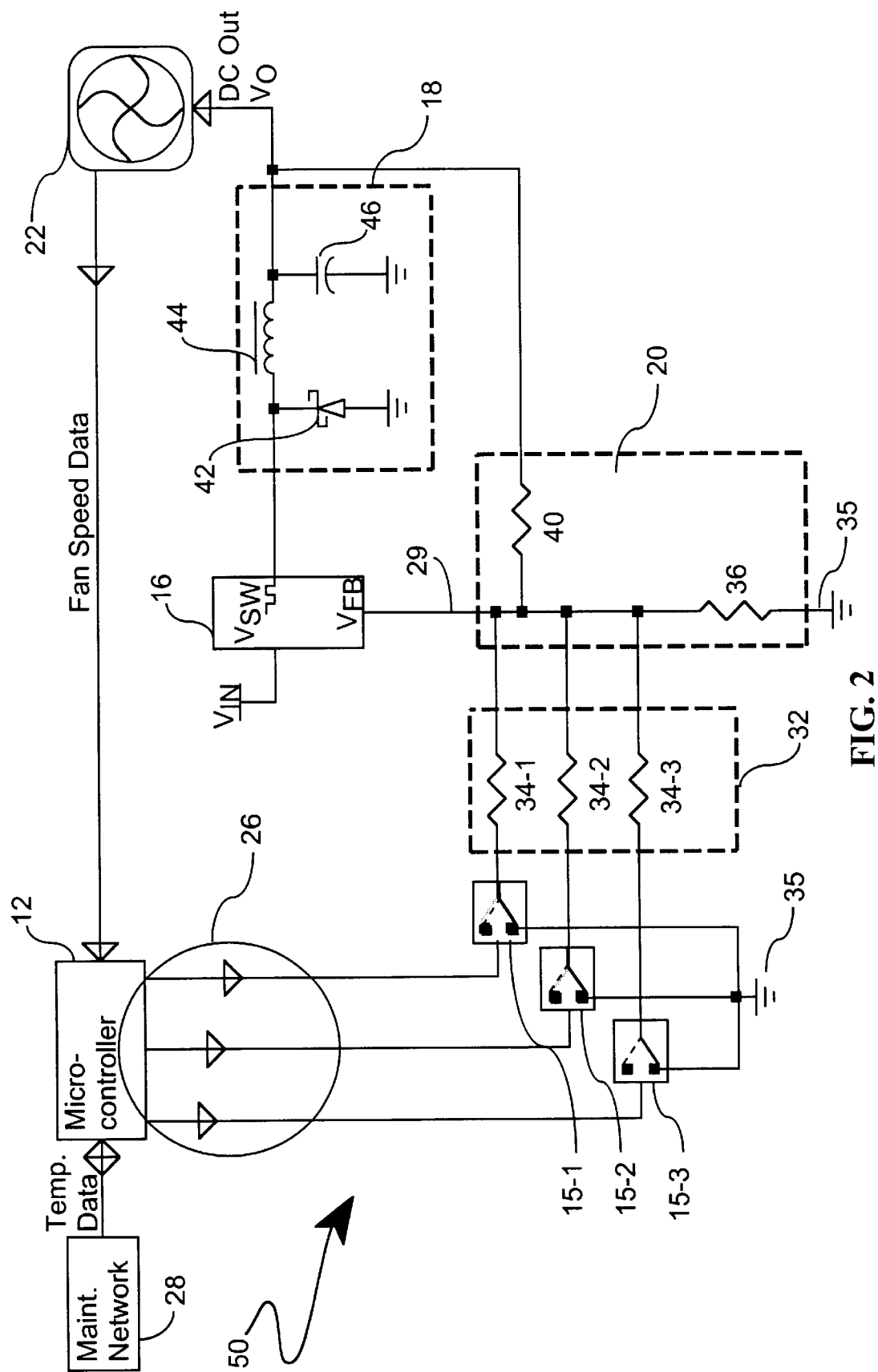
FIG. 2 is a circuit diagram for a fan control system in accordance with an alternate embodiment of the present invention.

FIG. 2 shows an alternative embodiment of a fan controller system 50. Only the aspects of system 50 that differ from the controller system 10 in FIG. 1 will be described. All other aspects of systems 50 and 10 are the same. In particular, controller system 50 has a feedback adjustment circuit 32 that controllably connects resistors 34 in parallel with the lower portion (i.e., resistor 36) of the feedback circuit 20, whereas the controller system 10 of FIG. 1 controllably connects resistors 30 in parallel with the upper portion (i.e., resistor 40) of the feedback circuit 20. Thus, in the system 50 of FIG. 2, when the microcontroller 12 turns on one or more bits of the control signal 26, the resistance of the lower portion of the feedback circuit decreases, which causes the voltage at the center node 29 of the feedback circuit 20 to decrease. This, in turn causes the power supply 16 to increase the output voltage until the voltage on center node 29 approximately equals its internal reference voltage.

While the present invention has been described with reference to specific embodiments, the description is illustrative of the invention and is not to be construed as limiting the invention. Various modifications may occur to the skilled artisan without departing from the true spirit or scope of the invention as defined by the appended claims.

What is claimed is:

1. An apparatus for regulating the power delivered to an electrical device, the apparatus comprising:

a microcontroller for outputting a digital signal in response to input data;

a variable power supply for generating an output voltage from an input voltage in accordance with a control signal received at a control port;

a resistor divider having an upper portion electrically coupled to the output voltage, a lower portion electrically coupled to a reference ground, and a center node coupled to the upper and lower portions and to the control port of the variable power supply; and a feedback adjustment module having a plurality of resistive elements and a corresponding plurality of coupling elements, each coupling element for electrically connecting a corresponding one of the resistive elements in parallel with a predefined one of the upper and lower portions of the resister divider when operation of the coupling element is enabled, a subset of the plurality of coupling elements being enabled in accordance with the digital signal output by the microcontroller, such that the effective resistance of the predefined portion of the resistor divider is modified by the subset of the resistive elements that are coupled in parallel therewith in accordance with the digital signal.

2. The apparatus of claim 1, wherein the variable power supply has an internal reference voltage and an internal control circuit that adjusts the output voltage until a voltage at the center node of the resistor divider is approximately equal to the internal reference voltage.

3. The apparatus of claim 2, wherein the digital signal includes a number of distinct binary signals, equal in number to said plurality of coupling elements, each distinct binary signal being coupled to and controlling operation of a corresponding one of the coupling elements.

4. The apparatus of claim 3, wherein the output voltage has a predefined number of output voltage values to which the output voltage is set, the predefined number corresponding to a predefined maximum number of distinct values for the digital signal;

the output voltage values include a highest output voltage value, corresponding to a lowest value of the digital signal; and the highest output voltage value is less than or equal to a predefined limit voltage associated with the electrical device;

whereby the output voltage generated by the apparatus does not exceed the predefined limit voltage, even when operation of the microprocessor fails.

5. The apparatus of claim 4, wherein the output voltage values include a lowest output voltage value, corresponding to a highest value of the digital signal.

6. The apparatus of claim 3, wherein the internal reference voltage is approximately 2.2 volts.

7. The apparatus of claim 1, wherein the variable power supply includes a single chip variable power switch that outputs a square wave signal having a variable duty cycle, and an LC filter that converts the square wave signal into the output voltage, wherein the output voltage is substantially constant so long as the digital signal remains constant.

8. The apparatus of claim 7, wherein the input data includes data selected from the set consisting of temperature, fan speed data and a combination thereof.

9. The apparatus of claim 1, wherein each resistive element, if any, not connected in parallel with the predefined portion of the resister divider forms an open circuit.

10. The apparatus of claim 1, wherein the coupling elements are optocouplers.

11. The apparatus of claim 10, wherein each of the plurality of resistive elements are electrically connected at a first end to the output voltage and are controllably connected by a corresponding one of the coupling elements to the center node of the resister divider.

12. The apparatus of claim 11, wherein each optocoupler is connected between a second end of a corresponding resistive element and the center node of the resistor divider, and wherein each optocoupler responds to a corresponding bit of the digital signal.

13. The apparatus of claim 12, wherein the resistive elements of the feedback adjustment module include at least three resistors.

14. The apparatus of claim 13, wherein the three resistors have approximate resistance values of 10K ohms, 20K ohms and 47.5K ohms.

15. A method for regulating the power delivered to an electrical device, the method comprising:

generating a digital signal in response to input data;

generating an output voltage from an input voltage in accordance with an analog control signal received at a control port;

dividing the output voltage with a resistor divider, the resister divider having an upper portion electrically coupled to the output voltage, a lower portion electrically coupled to a reference ground, and a center node coupled to the upper and lower portions, the center node of the resistor divider generating the analog control signal; and selectively electrically connecting a subset of a plurality of resistive elements in parallel with a predefined one of the upper and lower portions of the resister divider in accordance with the digital signal such that the effective resistance of the predefined portion of the resistor divider is modified by the subset of the resistive elements that are coupled in parallel therewith.

16. The method of claim 15, wherein the step of selectively electrically connecting includes selectively enabling a plurality of coupling elements in accordance with the digital signal, each of the enabled coupling elements electrically connecting a corresponding one of the resistive elements in parallel with the predefined portion of the resistor divider.

17. The method of claim 15, wherein the output voltage generating step includes generating a square wave signal having a variable duty cycle, and LC filtering the square wave signal so as to generate the output voltage, wherein the output voltage is substantially constant so long as the digital signal remains constant.

18. The method of claim 15, wherein the output voltage generated does not exceed a predefined limit voltage, even when generation of the digital signal fails and thereby generates the digital signal with an unknown value.

19. The method of claim 15, wherein the input data includes data selected from the set consisting of temperature, fan speed data and a combination thereof.

20. The method of claim 15, wherein the digital signal includes a number of distinct binary signals, equal in number to said plurality of resistive elements, each distinct binary signal determining whether a corresponding one of the resistive elements is electrically connected in parallel with the predefined portion of the resistor divider.

* * * * *